May 29, 1945.  J. KOLLMAN  2,377,015

MULTIPLE PAN SETS

Filed Aug. 3, 1942

JACK KOLLMAN
INVENTOR.

BY

Patented May 29, 1945

2,377,015

UNITED STATES PATENT OFFICE 2,377,015

MULTIPLE PAN SET

Jack Kollman, Chicago, Ill., assignor to Ekco Products Company, a corporation of Illinois Application August 3, 1942, Serial No. 453,337

3 Claims. (Cl. 220—23.2)

This invention relates to that class of baking pans employed in bakeries where it is desired for convenience in handling to employ a rigidly connected group of pans arranged in spaced assembly.

In baking pans of this type it has been customary to provide a frame formed of metal strapping surrounding and secured to the individual pans of the set in such a manner that the lower edge of the strapping provided a stop for cooperation with the upper limits of a subjacent pan set of similar construction to limit the depth of nesting of one pan set within the other. In handling pans of this type, particularly when removing the loaded pan set from the oven, the operator usually wears gloves to protect his hands against burns. In gripping the pan set, the operator usually desires to engage his fingers about the lower edge of the strapping opposite the space between a pair adjacent pans. It is therefore desirable to maintain the space below the lower edge of the strapping in this region free and clear of obstructions which might tend to hinder introduction of the operator's fingers into this space as well as to avoid any edges which might be snagged by the operator's gloves in withdrawing the fingers of the operator from said space during normal handling of the pan set.

In certain pan sets, however, because of the extra large size of the individual pans, it is desirable to provide additional strapping at the lower extremities of the set, with the result that the space below the lower edge of the upper strapping is so limited as to prevent or hinder access thereto.

It is therefore an object of this invention to provide a double strapped pan set having the lower strap so arranged opposite the space between a pair of adjacent pans that ample clearance below the upper strapping is available without impairing the efficiency of the lower strap in providing the desired added reinforcement across the space between said pans.

It is also an object of this invention to provide a bearing surface on said upper strapping portion against which the gloved finger of the operator may be easily and quickly drawn and comfortably sustained.

With the above and other objects in view, as will be apparent, this invention consists in the construction, combination and arrangement of parts, all as hereinafter more fully described, claimed and illustrated in the accompanying drawing, wherein:

Figure 1:
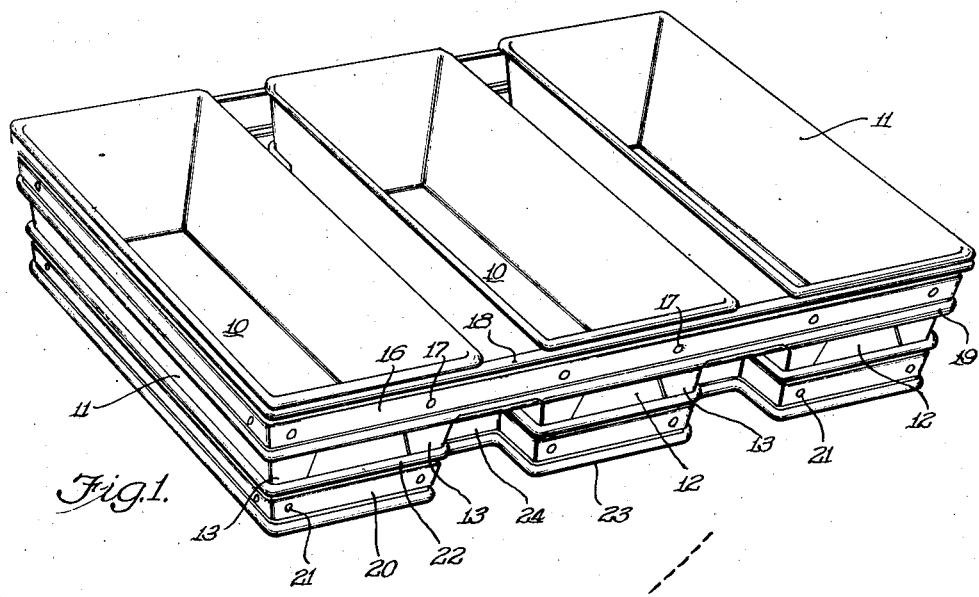
Fig. 1 is a perspective view of a baking pan set constructed in accordance with the present invention.
Figure 2:
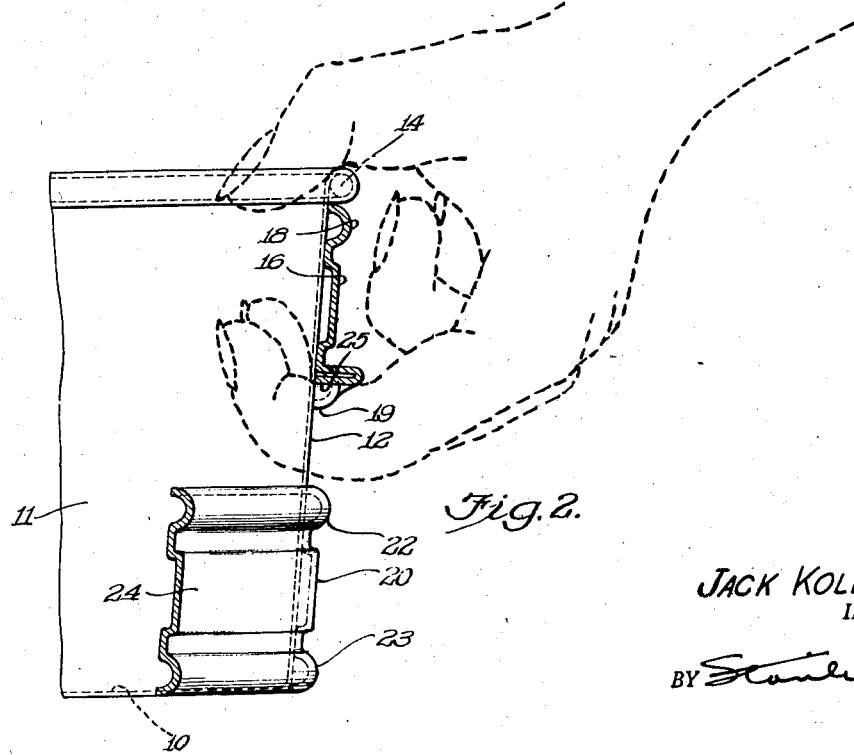
Fig. 2 is an enlarged vertical section through the strapping opposite the space between a pair of adjacent pans, with a dotted line representation indicating the manner in which the operator's fingers are positioned with reference to the strapping member during normal lifting and handling of the pan set shown in Fig. 1.

Reference being had to the accompanying drawing, the pan set selected for the purpose of illustrating an embodiment of this invention consists of three pans, each comprising a sheet of tin plate of conventional baking pan metal thickness and shaped to form a bottom 10, opposed side walls 11 and opposed end walls 12, said walls 11 and 12 rising upwardly therefrom a distance substantially equal to the length of the space between the side walls 11. The two thicknesses of surplus material developed at the corners are commonly taken care of by creating a V-shaped fold or flap 13 therefrom and flattening and bending the same into engagement with the pan end wall 12 adjacent thereto. The upper edges of the walls 11 and 12 are curled around a reinforcing wire 14, such as a steel wire about $\frac{3}{32}$ inch diameter, to form an outstanding reinforcing bead around the mouth of the pan. While the drawing shows an assembly of three pans, it will be apparent that a greater or lesser number may be used.

The pans are arranged in spaced parallel relation and secured together by means of a strap 16, usually of a thickness slightly greater than that of the material of the pans, which is bent to create a frame surrounding all of the pans of the set and positioned substantially flush against the exposed end walls 12 of the pans, near the bead 14 of said pans. This frame may made of a single strap 16 bent to correspond to the general outside shape or contour of the pan set or it may be made up in a series of individual straps abutting or overlapping at their ends where they are secured one to the other. Each strap 16 is pierced at suitable intervals by rivet holes through which, and similar perforations in the thicknesses of the corner folds 13, rivets 17 are passed to securely fasten the pans to the strap 16. The inner surfaces of the pan walls are accordingly entirely free of exposed rivets or other fastening means, thereby avoiding objectionable marking of the product baked in the pan because of such exposed fastening means.

The opposite longitudinal edges of the strapping member 16 are usually corrugated to form hollow beads 18 and 19 opening toward the pan wall so as to provide projecting surfaces beyond the plane of the rivet head 17 and thereby prevent snagging of the rivets 17 of adjoining pan sets when there is occasion to slide one set in close proximity to another set, as for example when loading several sets in compact assembly in the oven. The beads 18 and 19 also provide strengthening ribs lengthwise of the strapping 16.

In order to protect the bottom corners of the pans in the pan set as well as to further strengthen the connection between the individual pans and the strapping 16, it is necessary to provide an additional strapping member 20 at the lower limits of the pan set with its lower edge substantially flush with the bottom of the pans. Like the strapping 16, the strapping 20 is perforated by rivet holes registering with similar rivet holes in the corner folds 13 overlapped by said strapping 20, through which rivets 21 are passed to fasten the pans to the strapping 20. The edges of the strapping 20 is also corrugated to form hollow beads 22 and 23 corresponding to the beads 18 and 19 in the strapping member 16.

Opposite the space between adjacent pans, the strapping 20 is bent inwardly to follow the contour of the pan walls at opposite sides of said space so as to dispose the portion of the strap 20 in substantially inwardly offset relation to the plane common to the end walls of the adjacent pans, in the form of a bridge 24. Thus the bridge 24 does not interfere with free access to the space below the lower edge of the strap 16 for the purpose of accommodating free and easy admittance of the operator's fingers incident to normal handling of the set.

Since the material of the strapping member 16 is relatively thin, due to a desire to minimize the weight of the pan set, the lower edge of the strapping member 16 presents a relatively thin bearing surface. In order to provide a more natural finger bearing surface, the present invention contemplates collapsing the lower bead in such a manner that the free edge of the bead is disposed in close underlying engagement with the corner formed at the juncture of the strap and the upper half of the bead 19 and the undersurface of the lower half of the bead presents a relatively broad smooth flat surface 25. Thus, pressure of the fingers when flexed about said surface 25 is not limited to a relatively thin line comparable to the thickness of the strapping material 16 but is broadly distributed so as to afford a more comfortable finger bearing or gripping area, as well as a surface over which the gloved finger may be easily and quickly drawn.

What is claimed is:

1. The combination with a pair of sheet metal baking pans, each comprising a bottom, end walls and side walls, of means for rigidly connecting the same in series as an assembled unit with the side walls of adjacent pans maintained spaced apart and the end walls in alignment including a sheet metal strapping adapted to extend the full length of said assembled unit measured along said aligned pan end walls and positioned flush against and fastened to said pan walls, said strap through a portion thereof opposite the space between a pair of adjacent pans having an outwardly projecting relatively flat lip of a width many times the thickness of said strapping, and a sheet metal strapping positioned flush against and fastened to said pan walls below said first named strapping having portions thereof opposite the space between a pair of adjacent pans offset inwardly to maintain the space below the first named strapping in said region free for ready access by the fingers of an operator in handling the pan set.

2. The combination with a pair of sheet metal baking pans, each comprising a bottom, end walls and side walls, of means for rigidly connecting the same in series as an assembled unit with the side walls of adjacent pans maintained spaced apart and the end walls in alignment including a sheet metal strapping adapted to extend the full length of said assembled unit measured along said aligned pan end walls and positioned flush against and fastened to said pan walls with its lower edge intermediate the upper and lower limits of said pans, said strap through a portion thereof opposite the space between a pair of adjacent pans having an outwardly projecting relatively flat lip of a width many times the thickness of said strapping, and a sheet metal strapping positioned flush against and fastened to said pan walls below the lower edge of said first named strapping and having its lower edge substantially flush with the bottom limits of the pans, said latter strapping member having portions thereof opposite the space between a pair of adjacent pans bent inwardly against the pan walls at opposite sides of said space between pans and crossing said space substantially away from the plane common to the first named strapping means to maintain the space below the first named strapping in said region free for ready access by the fingers of an operator in handling the pan set.

3. The combination with a pair of sheet metal baking pans, each comprising a bottom, end walls and side walls, of means for connecting the same in series as an assembled unit and with the adjacent side walls of said pans maintained spaced apart and the end walls in alignment including a pair of strapping members adapted to extend the full length of said assembled unit measured along said aligned pan end walls and positioned flush against and fastened to said pan walls, one above the other, the lowermost strap throughout a portion thereof opposite the space between said pans being offset inwardly from the plane common to the aligned end walls of said pans to maintain the space below the uppermost strapping in said region free for admission of the operator's fingers in handling the pan set.

JACK KOLLMAN.